United States Patent
Hirata et al.

(10) Patent No.: US 8,011,833 B2
(45) Date of Patent: Sep. 6, 2011

(54) RETAINER FOR ROLLER BEARING, AND ROLLING BEARING

(75) Inventors: Masakazu Hirata, Mie (JP); Hideyuki Tsutsui, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/802,492

(22) Filed: Jun. 8, 2010

(65) Prior Publication Data

US 2010/0247013 A1    Sep. 30, 2010

Related U.S. Application Data

(62) Division of application No. 11/597,947, filed as application No. PCT/JP2005/010214 on Jun. 3, 2005, now Pat. No. 7,771,125.

(30) Foreign Application Priority Data

Jun. 7, 2004  (JP) .................... 2004-168366
Jun. 10, 2004  (JP) .................... 2004-172790
Aug. 23, 2004  (JP) .................... 2004-241738

(51) Int. Cl.
*F16C 33/44*  (2006.01)

(52) U.S. Cl. .................... 384/527; 384/470

(58) Field of Classification Search .......... 384/523, 384/526, 527–534, 470
See application file for complete search history.

(56) References Cited

U.S. PATENT DOCUMENTS

| | | | |
|---|---|---|---|
| 2,695,425 A | 11/1954 | Scott | |
| 3,500,525 A | 3/1970 | Glenn | |
| 4,073,552 A | 2/1978 | Christy | |
| 6,113,278 A | 9/2000 | Ohira | |
| 6,164,831 A | 12/2000 | Matsui et al. | |
| 2003/0099416 A1 | 5/2003 | Kinno et al. | |
| 2003/0138172 A1 | 7/2003 | Yabe | |

FOREIGN PATENT DOCUMENTS

| | | |
|---|---|---|
| GB | 2 296 536 | 7/1996 |
| GB | 2 342 128 | 4/2000 |
| JP | 01-093623 | 4/1989 |
| JP | 08-021450 | 1/1996 |
| JP | 08-177866 | 7/1996 |
| JP | 08-326760 | 12/1996 |
| JP | 10-036875 | 2/1998 |

(Continued)

OTHER PUBLICATIONS

International Search Report dated Aug. 30, 2005.

*Primary Examiner* — Thomas R Hannon
(74) *Attorney, Agent, or Firm* — Hedman & Costigan, P.C.; James V. Costigan

(57) ABSTRACT

A retainer for a rolling bearing, which is used for a food machine or a vacuum apparatus, containing an increased amount of a lubricating oil and enhancing a use efficiency of the lubricating oil and rolling bearing is described. The retainer consists of a molding, of a synthetic resin composition, which holds a rolling element of a rolling bearing. The molding is composed of a resinous porous article having an interconnected hole porosity not less than 30% and a lubricating oil which impregnates the resinous porous article. The resinous porous article has an interconnected hole are formed by molding a resin containing a pore-forming substance having a melting point higher than that of the resin and can be used as a food material, and by extracting said pore-forming substance from the molding with a solvent which dissolves the pore-forming substance and does not dissolve the resin.

14 Claims, 4 Drawing Sheets

FOREIGN PATENT DOCUMENTS

| | | |
|---|---|---|
| JP | 169661 | 6/1998 |
| JP | 11-166541 | 6/1999 |
| JP | 11-335687 | 12/1999 |
| JP | 61-006429 A | 1/2000 |
| JP | 2000-098152 | 4/2000 |
| JP | 2000-110838 | 4/2000 |
| JP | 2001-131569 | 5/2001 |
| JP | 2002-054637 | 2/2002 |

RETAINER FOR ROLLER BEARING, AND ROLLING BEARING

This application is a division of Ser. No. 11/597,947, filed Nov. 27, 2006, which claims the priority of PCT/JP2005/010214, filed Jun. 3, 2005 which claims the priority of JP P2004-168366 filed Jun. 7, 2004; JP P2004-172790 filed Jun. 10, 2004; and JP P2004-241738, filed Aug. 23, 2004.

TECHNICAL FIELD

The present invention relates to a rolling bearing retainer and a rolling bearing in which the retainer is used. More particularly the present invention relates to a retainer in which a resinous porous article having an interconnected hole is used, a rolling bearing, for a vacuum apparatus, in which the retainer is used, and a rolling bearing, for a food machine, in which the retainer is used.

BACKGROUND ART

The conventional rolling bearing retainer consists of metal, polyamide resin, polyacetal resin or polybutylene terephthalate resin. Particularly, when a synthetic resin is adopted, only a synthetic resin which can be injection-molded is used or a synthetic resin composition composed of a molding material made of a synthetic resin and glass fibers, carbon fibers or organic fibers added to the molding material to reinforce the synthetic resin is used. To lubricate the rolling bearing having the retainer, a lubricating oil or a semi-solid lubricant such as a lubricating grease is used.

But when a large amount of the semi-solid lubricant such as the lubricating grease is used, owing to a resistance to stirring caused by the use of this lubricant, a torque for rotating a rotary shaft supported by the bearing becomes large, and a torque fluctuation during the rotation of the rotary shaft also becomes large. Particularly in a conventional retainer-provided rolling bearing lubricated with grease, when the rotational speed of the shaft (inner ring or outer ring of rolling bearing) becomes high, a torque required to rotate the shaft supported by the bearing becomes large owing to the resistance to stirring caused by the use of a large amount of the lubricating grease. Thereby the temperature of the bearing rises. Therefore the torque is liable to fluctuate or the lubricating grease is liable to leak. Further owing to the presence of the lubricating grease, a comparatively large amount of dust is liable to float on the periphery of the bearing.

To improve these problems, rolling bearing retainers allowed to have a lubricating function by impregnating the material thereof with a lubricant are proposed.

For example, the following bearing retainers are known: the bearing retainer composed of polyamide-imide resin, molded porously by compression molding, which is impregnated with fluorinated oil (patent document 1); the retainer composed of the molded oil-containing plastic, containing the oil-containing binder and the matrix, which is impregnated with the lubricating oil (patent document 2); the resin composition, consisting of the mixture of the polyolefin resin and the lubricating oil, which is molded in the shape of a retainer (patent document 3); the resin composition, consisting of the mixture of the synthetic resin, the fibrous oil guide material, and the lubricating oil, which is molded in the shape of a retainer (patent document 4); and the resin composition, consisting of the synthetic resin to which the porous silica impregnated with the lubricating oil is added, which is molded in the shape of a retainer (patent document 5).

But in the case of the bearing retainer composed of the polyamide-imide resin, molded porously by compression molding, which is impregnated with the fluorinated oil, after powdery resin is compression-molded, it is sintered. Thus as described later, it is theoretically and actually impossible that the interconnected hole porosity exceeds 30%. Therefore the amount of the lubricating oil capable of impregnating the polyamide-imide resin is less than the interconnected hole porosity of 30%. In dependence on a use condition, the lubricating amount may be short. Further there is a restriction in the kind of the resinous material in which an interconnected hole can be formed by the compression molding. That is, there is a restriction in the kind of the resin which can be used.

It is necessary that the retainer composed of the molded oil-containing plastic, containing the oil-containing binder and the matrix, which is impregnated with the lubricating oil is immersed in the lubricating oil at a high temperature (120° C. to 130° C.) for a long period of time (about seven days) to increase the oil impregnation amount. Therefore there is a fear that the lubricating oil and the resin forming the retainer deteriorate, and a large dimensional change is made. Consequently a product is inferior in stability, and it is difficult to keep a stable lubricity for a long time.

In the resin composition, consisting of the mixture of the polyolefin resin and the lubricating oil, which is molded in the shape of the retainer, the lubricating oil is held by the use of the polyolefin resin having a high oil-absorbing performance. Thus a small amount of the lubricating oil bleeds. Even though the lubricating oil is dispersed uniformly in the resin, it is technically difficult to bleed the lubricating oil from the inside of the retainer at a stable speed for a long time, although the lubricating oil in the neighborhood of the surface thereof.

When a large amount of the lubricating oil is used, a problem occurs in terms of production. For example, there occur disadvantages that a screw slides in injection molding; metering is unstably performed and hence a cycle time becomes long; dimensional accuracy is difficult to obtain; the lubricant sticks to the surface of a die and a molded surface has a poor finish; and the like. Therefore there is a limitation in the kind of the resin which can be used and in the kind of the lubricating oil which can be used, its viscosity, vapor pressure, and decomposition temperature.

In the resin composition, consisting of the mixture of the synthetic resin, the fibrous oil guide material, and the lubricating oil, which is molded in the shape of the retainer; and the resin composition, consisting of the synthetic resin to which the porous silica impregnated with the lubricating oil is added, which is molded in the shape of the retainer, the resin and the lubricating oil are mixed with each other before the resin compositions are molded. In this case, the lubricating oil is required to withstand a resin-molding temperature. Similarly to the above-described case, there is a limitation in the kind of the resin which can be used and in the kind of the lubricating oil which can be used, its viscosity, vapor pressure, and decomposition temperature. Because the screw slides in the injection molding, it is necessary to reduce the amount of the lubricating oil to stably supply the material into a molding machine. Because the maximum amount of the lubricating oil is less than 30%, the lubricating amount may be short in dependence on a use condition of the rolling bearing.

Inside the rolling bearing, usually, as the lubricant held inside the rolling bearing to decrease the friction coefficient between the inner and outer rings and the rolling element as well as the retainer and improve the durability of the bearing, a liquid lubricant, a semi-solid lubricant or a solid lubricant is appropriately used in dependence on the use thereof. For example, in a rolling bearing which is used in a closed clean atmosphere such as semiconductor-manufacturing equipment and particularly in a rolling bearing which is used in a low-pressure clean atmosphere such as a vacuum atmosphere, vapor generated from the liquid lubricant and the semi-solid lubricant and scattered fine particles may adversely affect the performance of precision parts. Therefore the liquid lubricant and the solid lubricant having a low vapor pressure are used. In recent years, because semiconductor precision parts and the like in which a conductive pattern has a very small width have come to have high performance, a very high dust-unraiseable performance is demanded.

Conventionally, as rolling bearings, for use in a vacuum apparatus, which comparatively favorably comply with the demand of the high dust-unraiseable performance, the retainer consisting of the porous article made of the polyamide-imide resin impregnated with the low vapor-pressure fluorinated oil used as the lubricating oil for the rolling bearing (patent document 1), and the retainer consisting of the porous article made of the polyimide, more heat-resistant than the polyamide-imide, which is impregnated with the fluorinated oil (patent document 6) are known. The bearing in which the retainer consisting of the porous article is impregnated with the alkylated cyclopentane oil serving as the lubricating oil. (patent document 7) is also disclosed.

But in the rolling bearings of the patent documents 1 and 6, because the porous retainer is impregnated with the fluorinated oil serving as the lubricating oil, a large centrifugal force is applied to the retainer during a rotation of the bearing. Consequently the rotational efficiency of the bearing deteriorates, and the torque fluctuates to a high extent. These rolling bearings are not sufficiently reliable in the durability thereof when they are used at a high surface pressure (about 2 GPa).

In the bearing of the patent document 7, the above-described problem which occurs owing to the use of the fluorinated oil for the retainer is solved. But the interconnected hole porosity of the retainer is 5 to 250. Therefore the amount of the lubricating oil with which the porous article of the retainer can be impregnated is small and hence it is impossible to prolong the period of time in which the bearing can be used.

The rolling bearing can be used for a food machine used to mix, knead, heat, dry, cool, charge, pack, and store food materials and edible products (or semi-products). As in the case of other machines, the bearing and other sliding parts are mounted on the food machine. It is necessary to prevent ingredients of these parts harmful to the human body from flowing into food. Therefore in accordance with the legal sanitary standard, it is necessary to choose materials such as resin, metal, lubricating oil, and grease, and additives composing the parts.

As the legal sanitary standard regarding various materials of the parts of the food machine, the authorization standards such as the standard of food and additives (notified by Ministry of Health, Labor and Welfare), FDA (Food and Drug Administration of U.S.), and H-I standard (standard that a material is unharmful to the human body when it directly contacts food) of USDA (Department of Agriculture of U.S.) are well known. These authorization standards specify ingredients which can be used as materials for the food machine, separately from materials for general industries.

In the known solid lubricant and rolling bearing for use in the food machine, the solid lubricant is used to prevent the lubricant from being washed away even though water penetrates into the bearing and make it difficult for rust to be generated even though a solution of salt penetrates into the bearing to maintain the lubricating properties of the bearing and the like for a long time (patent document 8).

The rolling bearing for use in the food machine is known in which the solid lubricant, for the food machine, which is not washed away with water and withstands a successive use at a high temperature higher than 150° C. is enclosed in the bearing to make it difficult for rust to be generated in a condition in which the bearing contacts a solution of salt (patent documents 9 and 10).

In these rolling bearings for the food machine, although the solid lubricant is not washed away with water, the solid lubricant is produced by the method of kneading the resin and the lubricant in advance to obtain the greasy resin and thereafter calcining the mixture, with the resin enclosed in the bearing. Thus even in the combination of the resin and the grease both of which can be used at a high temperature as disclosed, the resin is calcined at a high temperature. Therefore there is a possibility that the lubricating oil deteriorates while the resin is being calcined. Consequently in putting the bearing to practical use, there may be a case in which restrictions are imposed on the combination of the resin and the grease both of which can be used at a high temperature. Thus the solid lubricant has a problem that the degree of freedom in the combination of the resin and the grease suitable for a use is low (patent documents 8 to 10). Further to prevent the bearing from being rusted, a large amount of the solid lubricant is increased in the bearing. Therefore the bearing has a problem that it has a high torque (patent document 8) until the solid lubricant is compatible with the bearing.

Patent document 1: Japanese Patent Application Laid-Open No. 61-6429
Patent document 2: Japanese Patent Application Laid-Open No. 1-93623
Patent document 3: Japanese Patent Application Laid-Open No. 8-21450
Patent document 4: Japanese Patent Application Laid-Open No. 11-166541
Patent document 5: Japanese Patent Application Laid-Open No. 2002-98152
Patent document 6: Japanese Patent Application Laid-Open No. 8-177866
Patent document 7: Japanese Patent Application Laid-Open No. 10-169661
Patent document 8: Japanese Patent Application Laid-Open No. 10-36875
Patent document 9: Japanese Patent Application Laid-Open No. 11-335687
Patent document 10: Japanese Patent Application Laid-Open No. 2001-131569

DISCLOSURE OF THE INVENTION

Problem to be Solved by the Invention

It is an object of the present invention to allow a large amount of oil to be contained in a retainer, made of resin, which contains a lubricating oil and enhance a use efficiency of the lubricating oil. Thereby it is possible to provide a retainer that can be used even though the lubricating grease is not enclosed therein or even though a small amount of the lubricating grease is enclosed therein. Further it is possible to provide a retainer in which a combination of a resinous material and the lubricating oil can be arbitrarily selected in dependence on a use.

It is another object of the present invention to provide a rolling bearing in which the above-described retainer is used.

It is still another object of the present invention to provide a retainer in which a gas is not generated from the lubricating oil even though the retainer is used under vacuum, dust is raised to a low extent, which contains a large amount of oil, and can be used for a long time; and a rolling bearing in which the above-described retainer is used.

It is still another object of the present invention to provide a rolling bearing, for a food machine, which has a high mechanical strength and contains a lubricating oil at a high ratio, allows the combination of a resinous material and a lubricating oil to be freely selected according to a use and specification of the rolling bearing for the food machine, has a low torque, and has a high durability even at a high temperature.

Means for Solving the Problems

The rolling bearing retainer of the present invention consists of a molding, of a synthetic resin composition, which holds a rolling element of a rolling bearing. The molding is composed of a resinous porous article having an interconnected hole porosity not less than 30% and a lubricating oil which impregnates the resinous porous article. The resinous porous article are formed by molding a resin containing a pore-forming substance incorporated therein, and by extracting the pore-forming substance from the molding with a solvent which dissolves said pore-forming substance and does not dissolve the resin.

The rolling bearing of the present invention has an inner ring having a rolling surface on a peripheral surface thereof; an outer ring, having a rolling surface on an inner peripheral surface thereof, which is disposed concentrically with the inner ring; a plurality of rolling elements disposed between the both rolling surfaces; and a retainer holding a plurality of the rolling elements. The above-described retainer is the above-described rolling bearing retainer of the present invention.

The rolling bearing of the present invention is used in an atmosphere having a pressure not more than $1.0 \times 10^{-4}$ Pa.

Other rolling bearing of the present invention is used for a food machine.

EFFECT OF THE INVENTION

The rolling bearing retainer of the present invention is composed of the resinous porous article having the interconnected hole porosity not less than 30% and the lubricating oil which impregnates the resinous porous article. The rolling bearing in which this retainer is used has a small torque required for rotation and a small torque fluctuation. Further because the lubricating oil is supplied to the rolling bearing from the retainer for a long time, the rolling bearing displays an excellent durability. Furthermore it is possible to arbitrarily select the combination of the lubricating oil impregnating the resinous porous article and the base oil of the lubricating grease. Therefore it is possible to select the mutually soluble base oil in a condition of environment where the rolling bearing operates and further set a grease-enclosing amount to 5 to 20% of the volume of the entire space of the bearing. Consequently it is possible to obtain the rolling bearing from which grease leaks in a small amount.

It is possible to select the lubricating oil, impregnating the rolling bearing retainer, which has the vapor pressure not more than $1.0 \times 10^{-5}$ Pa at 40° C. Therefore under a vacuum condition ($1.0 \times 10^{-4}$ Pa), it is possible to obtain the rolling bearing which prevents the lubricating oil from vaporizing, has a high dust-unraiseable performance, has an excellent durability, and can be used for a long time.

By using the retainer of the present invention, it is possible to select the combination of the resin and the lubricating oil according to use and specification of the rolling bearing for use in the food machine. Consequently it is possible to obtain the rolling bearing, for the food machine, which has a superior strength and heat resistance, a low coefficient of friction, and a high wear resistance.

BEST MODE FOR CARRYING OUT THE INVENTION

FIG. 1 shows an example of the construction of the rolling bearing retainer using a resinous porous article. FIG. 1 is a partly enlarged perspective view of a crown-shaped retainer composed of an integrally molded resin composition. In a rolling bearing retainer 1, a pair of opposed retainer claws 3 is circumferentially formed on an upper surface of an annular retainer body 2 at a predetermined interval. The opposed retainer claws 3 are curved in a direction in which the opposed retainer claws 3 approach to each other. A rolling element-holding pocket 4 for holding a ball serving as a rolling element is formed between the opposed retainer claws 3. A flat portion 5 serving as a reference plane of the erection of the retainer claws 3 is formed between a rear surfaces of each of the adjacent retainer claws 3.

The retainer made of resin is composed of a resinous porous article having an interconnected hole porosity not less than 30% and a lubricating oil which impregnates the resinous porous article.

The interconnected hole porosity of the resinous porous article is theoretically computed as follows:

As a form of most densely packing a sphere by a point contact, a face-centered cubic lattice and a hexagonal closest packing are known. The packing percentage thereof is calculated by (volume of sphere÷volume of circumscribed cube)÷(height of equilateral triangle÷base)÷(height of regular tetrahedron÷one side) and is both 74%. The interconnected hole porosity defined as (100-packing percentage) is 26%.

The above-described computation is performed on the assumption that spheres having the same size are packed. When spheres having a plurality of sizes are packed, the packing percentage is higher and the interconnected hole porosity becomes lower than those of the hexagonal closest packing.

When powdery spherical resin particles are compression-molded and then sintered, point contact is impossible but the spherical resin particles deform and make face contacts. Therefore the packing percentage is higher and the interconnected hole porosity becomes lower than those of the hexagonal closest packing. Thus the interconnected hole porosity of the conventional sintered resinous material is up to 20%.

The definition of the interconnected hole porosity used in the present invention is almost the same as that of the above-described interconnected hole porosity and means the interconnected hole porosity when pores are continuous. That is, the interconnected hole porosity means the ratio of the total volume of the pores continuous with one another to the volume of the resinous molding.

More specifically, the interconnected hole porosity is calculated by the method shown by an equation (1) in "numerical equation 1".

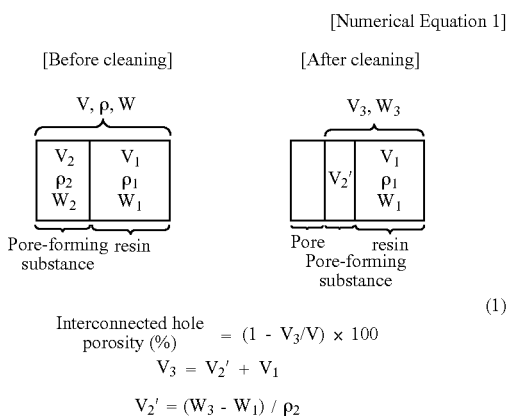

[Numerical Equation 1]

$$\text{Interconnected hole porosity (\%)} = (1 - V_3/V) \times 100 \quad (1)$$

$$V_3 = V_2' + V_1$$

$$V_2' = (W_3 - W_1) / \rho_2$$

In the above-described equation 1, meanings of each reference symbols are shown below:
V: Volume of molding formed by heating compression molding method before cleaning
ρ: Density of molding formed by heating compression molding method before cleaning
W: Weight of molding formed by heating compression molding method before cleaning
$V_1$: Volume of resinous powder
$\rho_1$: Density of resinous powder
$W_1$: Weight of resinous powder
$V_2$: Volume of pore-forming substance
$\rho_2$: Density of pore-forming substance
$W_2$: Weight of pore-forming substance
$V_3$: Volume of porous article after cleaning
$W_3$: Weight of porous article after cleaning
$V'_2$: Volume of pore-forming substance remaining in porous article after cleaning In the present invention, by using a producing method described below, the resinous porous article having an interconnected hole porosity not less than 30% and favorably 30% to 90% and more favorably 30% to 70% is obtained.

The resinous porous article which can be used in the present invention is formed by molding the resin containing the pore-forming substance into the molding, thereafter dissolving the pore-forming substance, and extracting the pore-forming substance from the molding with the solvent not dissolving the resin therein. For example, after a resin A which is molded at X° C. is mixed with a water-soluble powder B having a melting point Y° C. higher than X° C. to form a molding by molding a mixture at X° C., the water-soluble powder B is extracted from the molding with water. Thereby the porous article is formed.

As resins usable in the present invention, it is possible to use resinous powder and a pellet of thermoplastic resin, thermosetting resin, elastomer or rubber. When the resinous powder and the pellet are molded by fusing them, they are kneaded together with the pore-forming substance. Therefore the particle diameter and configuration of the resinous powder and the pellet are not specifically limited. When they are dry-blended and molded by compressing them, it is preferable that an average particle diameter is 1 to 500 μm.

As the thermoplastic resin or the thermosetting resin, it is possible to list polyethylene resin such as low-density polyethylene, high-density polyethylene, an ultra-high-molecular-weight polyethylene; modified polyethylene resin, water crosslinking polyolefin resin, polyamide resin, aromatic polyamide resin, polystyrene resin, polypropylene resin, silicone resin, urethane resin, polytetrafluoroethylene resin, chlorotrifluoroethylene resin, tetrafluoroethylene-hexafluoropropylene copolymer resin, tetrafluoroethylene-perfluoroalkyl vinyl ether copolymer resin, vinylidene fluoride resin, ethylene-tetrafluoroethylene copolymer resin, polyacetal resin, polyethylene terephthalate resin, polybutylene terephthalate resin, polyphenylene ether resin, polycarbonate resin, aliphatic polyketone resin, polyvinyl pyrrolidone resin, polyoxazoline resin, polyphenylene sulfide resin, polyether sulfone resin, polyether imide resin, polyamide imide resin, polyether ether ketone resin, thermoplastic polyimide resin, thermosetting polyimide resin, epoxy resin, phenol resin, unsaturated polyester resin, vinyl ester resin. It is also possible to exemplify mixtures, namely, polymer alloys each consisting of not less than two kinds of the above-described synthetic resins.

As the elastomer or the rubber, it is possible to exemplify vulcanized rubbers such as acrylonitrile butadiene rubber, isoprene rubber, styrene rubber, butadiene rubber, nitrile rubber, chloroprene rubber, butyl rubber, acrylic rubber, silicone rubber, fluoro rubber, ethylene propylene rubber, chlorosulfonated polyethylene rubber, chlorinated polyethylene rubber, and epichlorohidrin rubber; and thermoplastic elastomers such as polyurethane elastomer, polyester elastomer, polyamide elastomer, polybutadiene elastomer, and soft nylon elastomer.

In the case of a retainer for use in a rolling bearing that is used under a vacuum condition, the thermal conductivity is lower in the vacuum condition than in the air. Thus frequently the bearing is used at a high temperature. Therefore, of the resins listed above, the polytetrafluoroethylene resin, the polyether ether ketone resin, and the polyimide resin are preferable.

The food machine is used when food materials or edible products (or semi-products) are processed. Thus there are machine parts which directly contact the food materials or the edible products (or semi-products). There are machine parts such as a bearing and other sliding parts, mounted on the food machine, which do not directly contact the food materials or the edible products (or semi-products). There is a possibility that material components flow out of the machine parts which contact and do not contact the food materials and the edible products (or semi-products) and penetrate into food. There are the legal sanitary standards regarding various materials for uses of food. There are the standard of food and additive provided by the Food Sanitation Law, the FDA standard, and the H-I standard of USDA. Separately from materials of general industries, in accordance with these standards, it is necessary to select materials for the food machine.

As the material for the retainer used for the rolling bearing for use in the food machine, it is possible to use at least one of polyolefin resin, polyamide resin, polyacetal resin, fluororesin, polyether ether ketone resin, polyethylene terephthalate resin, polybutylene terephthalate resin, and biodegradable resin.

As the polyolefin resin which can be used in the present invention, it is possible to adopt powder of polyethylene resin, polypropylene resin, and polybutene resin or copolymers of these polyolefin resins or mixed resin powder consisting of the above-described resin powders mixed with one another at required ratios. The average molecular weight of each resin powder measured by a viscosity method is not less than 150000.

The high-density polyethylene (HDPE) which can be used in the present invention is produced by a low-pressure polymerization method using a Ziegler type catalyst. The average molecular weight of the HDPE is 50000 to less than 150000.

Ultra-high-molecular-weight polyolefin resin or the high-density polyethylene having the average molecular weight in this range are superior to low-density polyethylene resin in the rigidity and oil-retaining performance thereof and hardly flows even when they are heated to 90° C.

The mixing ratio of the ultra-high-molecular-weight polyolefin resin or the high-density polyethylene to an entire material is 95 to 1 wt %. According to a mixing amount of these resins in the above-described range, a desired, oil separation, toughness, and hardness of a composition change. That is, as the mixing amount of the ultra-high-molecular-weight polyolefin resin or the high-density polyethylene resin becomes larger, a molding which has been dispersedly held at a predetermined temperature and become solid becomes increasingly hard.

When a stabilizer, for example, an antioxidant is required to prevent deterioration of the polyolefin synthetic resin and particularly when weather ability is required, it is ordinary that a material contains a slight amount of 0.001 to 0.05 wt % of ultraviolet ray absorber (or optical stabilizer) as necessary. Because the polyolefin synthetic resin is unharmful, the stabilizers are selected from among those safe for the human body.

As antioxidants which conform to the standard provided by the FDA and are effective for the polyolefin synthetic resin, it is possible to list N,N' di-2-naphtyl-p-phenylenediamine, 2,6-di-t-butyl-4-methylphenol, 2(3)-t-butyl-4-hydroxyanisole, 2,2'-methylene-bis-(4-methyl-6-t-butylphenol), 2,2'-methylene-bis-(4-ethyl-6-t-butylphenol), 4,4'-methylene-bis(2,6-t-butylphenol), 2,2'-dihydroxy-3,3'-di-(α-methylcyclohexyl)-5,5'-dimethyl-diphenylmethane, 1,3,5-trimethyl-2,4,6-tris(3,5-di-t-butyl-4-hydroxybenzyl)benz ene, 4,4'-thiobis-(6-t-butyl-3-methylphenol), 1,1,3-tris-(2-methyl-4-hydroxy-5-t-butylphenyl)butane, 4,4'-butylidenebis-(3-methyl-6-t-butylphenol), n-octadecyl-3-(4'-hydroxy-3',5'-di-t-butyl-phenyl)propionate, tetrakis-[methylene-3-(3',5'-di-t-butyl-4'-hydroxyphenyl)propionate]methane, tris (nonyl-phenyl) phosphite, tris (mixed monononylphenyl and dinonylphenyl) phosphite, dilauryl-thiodipropionate, distearyl-thiodipropionate, dimirystil-3,3'-thiodipropionate.

In consideration of safety, of these antioxidants, those conforming to the standard of FDA as safe substances are preferable. For example, the 2,6-di-t-butyl-4-methylphenol, the 2(3)-t-butyl-4-hydroxyanisole, and the dilauryl-thiodipropionate are listed.

As the ultraviolet ray absorbers (or optical stabilizer) which have passed the standard of the FDA and are effective for the polyolefin synthetic resin, 2-hydroxy-4-n-octoxy-benzophenon and 2-(2'-hydroxy-3'-t-butyl-5'-methyl-phenyl)-5-chloro-benzotriazole are listed.

The above-described polyolefin synthetic resin containing a slight amount of the stabilizer basically conforms to the standard of the FDA and is preferable as a resinous material forming a porous article to be incorporated in the rolling bearing of the present invention for use in the food machine.

These additives do not have to be necessarily contained in the polyolefin synthetic resin.

Polyamide resin, polyacetal resin, and fluororesin which can be used in the present invention are admitted as safe substances when they contact and penetrate thereinto by the standard of food and additive provided by the Food Sanitation Law or the FDA standard.

Each of the polyamide resin (melting point: 179 to 295° C., coefficient of linear thermal expansion: 8 to 10×10$^{-5}$ cm/cm/° C.), the polyacetal resin (melting point: 175 to 181° C., coefficient of linear thermal expansion: 8.5 to 10×10$^{-5}$ cm/cm/° C.), and the fluororesin (melting point: 270 to 330° C., coefficient of linear thermal expansion: 5.9 to 10×10$^{-5}$ cm/cm/° C.) has a higher melting point and a lower coefficient of linear thermal expansion than the ultra-high-molecular-weight polyolefin. Thus these resins are materials which can be used at 150° C.

As examples of the polyamide resin, polyamide 11 (nylon 11), polyamide 12 (nylon 12), polyamide 46 (nylon 46), polyamide 6 (nylon 6), polyamide 6-6 (nylon 66), polyamide 6-66 (nylon 6/66), polyamide 6-10 (nylon 610), polyamide 6-12 (nylon 6/12), polyamide 12-12 (nylon 1212), polyamide MXD6 (nylon MXD-6) are listed.

As the resin which can be used in the present invention, resins such as the polyamide resin, the polyacetal resin, the fluororesin having the required properties are adopted. Further the lubricating oil unharmful in terms of food sanitation is dispersed and held in these resins. Therefore, these resins are not washed away with water which has penetrated into the bearing and have a heat resistance to such an extent that they can be used successively at 150° C.

The polyether ether ketone resin, the polyethylene terephthalate resin, and the polybutylene terephthalate resin; and the biodegradable resin which can be used in the present invention are substances which have been admitted by the FDA standard and the Sanitation Council Safety Standard respectively as being safe when they contact foods and penetrate thereinto. The biodegradable resin includes polylactic acid.

As the pore-forming substance, it is possible to use a substance, having a melting point higher than that of a resin-molding temperature, which is added to the resin to mold a mixture of the pore-forming substance and the resin into a molding and can be extracted from the molding by using a solvent not dissolving the resin therein.

The pore-forming substance consisting of a water-soluble substance which makes it easy to perform the cleaning and extraction steps is preferable. An alkali substance is also favorable. A weak alkali substance that can be used as a rust preventive agent is more favorable. As the weak alkali salts, organic alkali metal salts, organic alkali earth metal salts, inorganic alkali metal salts, and inorganic alkali earth metal salts are listed. It is preferable to use the organic alkali metal salts and organic alkali earth metal salts because these salts are soft and hardly damage a rolling surface and a sliding surface, even when an unextracted portion of the pore-forming substance drops. These metal salts can be used singly or by mixing not less than two kinds thereof with each other. It is preferable to use water-soluble weak alkali salts because they allow the use of inexpensive water as a solvent for cleaning use and facilitate processing of waste water in forming the pore.

To prevent dissolving of the pore-forming substance at a molding time, as the pore-forming substance, a substance having a melting point higher than a temperature at which the resin to be used is molded is used.

As water-soluble organic alkali metal salts that can be preferably used in the present invention, it is possible to list sodium benzoate (melting point: 430° C.), sodium acetate (melting point: 320° C.), sodium sebacate (melting point: 340° C.), sodium succinate, and sodium stearate. The sodium benzoate, the sodium acetate, and the sodium sebacate are especially preferable because they have a high melting point respectively and are compatible with many kinds of resins.

As the inorganic alkali metal salt, potassium carbonate, sodium molybdenum, potassium molybdenum, and potassium tungstate are listed.

As the pore-forming substance used to produce the retainer for the rolling bearing for use in the food machine, it is possible to use a substance which can be used for food materials, has a melting point higher than a resin-molding temperature, is mixed with the resin which is processed into a molding, is melted in a solvent which does not melt the resin, and extracted from the molding.

To prevent dissolution of the pore-forming substance at a molding time, as the pore-forming substance, it is preferable to use a substance having a melting point higher than a temperature at which the resin to be used is molded.

As the pore-forming substance which is soluble in water usually used as the solvent and which can be extracted from the molding, it is possible to list sodium benzoate (melting point: 430° C.), sodium acetate (melting point: 320° C.), sodium sebacate (melting point: 340° C.), sodium succinate (melting point: 300° C.), sodium stearate (melting point: 270° C.), sodium chloride (melting point: 800° C.), sodium carbonate (melting point: 851° C.), sodium methaphosphate (melting point: 628° C.), sodium pyrophosphate (melting point: 983° C.), sodium triphosphate (melting point: 988° C.), potassium carbonate (melting point: 891° C.), and potassium sulfate (melting point: 1067° C.). The sodium chloride, the sodium carbonate, the sodium benzoate, the sodium methaphosphate, the sodium pyrophosphate, the sodium triphosphate, the potassium carbonate, and the potassium sulfate are especially preferable for the retainer which is used for the rolling bearing for use in the food machine, because they have a high melting point respectively, are compatible with many kinds of resins, have a high solubility, and remain in a resinous porous article and thus do not adversely affect the human body even though they penetrate into food.

An average particle diameter of the pore-forming substance is controlled according to a use of the resinous porous article. When the resinous porous article is used as an oil-retaining material, the pore-forming substance having an average particle diameter of 1 to 500 μm is preferable.

The ratio of the pore-forming substance to the total amount of the resinous powder, the pore-forming substance, and other components including a filler is 30 vol % to 90 vol % and favorably 40 vol % to 90 vol %. If the ratio of the pore-forming substance is less than 30 vol %, it is difficult for pores of the resinous porous article to be interconnected. If the ratio of the pore-forming substance is more than 90 vol %, a desired mechanical strength cannot be obtained.

At the mixing time, a filler insoluble in the solvent which is used to extract the pore-forming substance may be used. For example, when water is used as the solvent, glass fiber, carbon fiber or the like may be added to the resin to improve the mechanical strength of the resinous porous article.

The method of mixing the resinous material and the pore-forming substance with each other is not specifically limited, but kneading methods such as dry blend, melt kneading, and the like generally used are applicable.

Further it is possible to use a method of dissolving the pore-forming substance in the liquid solvent to obtain a transparent solution, dispersion mixing the resinous powder in the transparent solution, and thereafter removing this solvent.

The method of dispersing and mixing the resinous powder is not specifically limited, provided that the mixing can be accomplished in the solution. But it is possible to use a ball mill, an ultrasonic dispersing machine, a homogenizer, a juicer mixer, a Henschel mixer, and the like. To restrain the separation of the dispersion solution, addition of a small amount of a surface active agent is effective. At the mixing time, the amount of the solvent should be secured to completely dissolve the pore-forming substance by the mixing.

As the method of removing the solvent, it is possible to use a heating evaporation method, a vacuum evaporation method, a bubbling method to be carried out by using nitrogen gas, a dialyzing method, and a freeze-drying method. It is preferable to remove the liquid solvent by the heating evaporation method, because this method can be easily carried out, and equipment for carrying out this method is inexpensive.

In molding the mixture of the resin and the pore-forming substance, it is possible to adopt any desired molding methods such as a compression molding method, an injection molding method, an extrusion molding, a blow molding method, a vacuum molding method, a transfer molding method, and the like. To improve workability before performing a molding operation, the mixture may be processed into a pellet or a prepreg.

The pore-forming substance is extracted from the obtained molding by dissolving the pore-forming substance and cleaning the molding with the solvent not dissolving the above-described resin therein.

As the above-described solvent, it is possible to use water and solvents compatible with water, for example, an alcohol solvent, an ester solvent, and a ketone solvent. These solvents are appropriately selected according to the kind of the resin and the pore-forming substance and the above-described condition. These solvents may be used singly or by mixing not less than two kinds thereof with each other. It is preferable to use water, because processing of waste water can be performed easily and at a low cost.

By performing the above-described extraction processing, the resinous porous article in which the pore-forming substance has been formed is dissolved and pores are formed at the dissolved portion is obtained.

In the retainer of the present invention, the above-described resinous porous article is impregnated with the lubricating oil.

In the retainer of the rolling bearing retainer for use in a vacuum apparatus, a lubricating oil having a vapor pressure not more than $1.0 \times 10^{-5}$ Pa at 40° C. is preferable. When the vapor pressure of the lubricating oil at 40° C. is not more than $1.0 \times 10^{-5}$ Pa, the exhalation of the lubricating oil can be prevented and can be used under vacuum when the retainer is used in a pressure atmosphere not more than $1.0 \times 10^{-4}$ Pa.

As the above-described lubricating oil, petroleum lubricating oil refined to a high extent to allow it to have the above-described low vapor pressure, alkylated cyclopentane oil, perfluoropolyether oil are listed.

It is preferable to use the alkylated cyclopentane oil because it is the lubricating oil which is capable of sufficiently withstanding the use in the vacuum condition, heat-resistant, chemical-resistant, solvent-resistant, and load-resistant. When a surface pressure to be applied to a rolling surface is low, the perfluoropolyether oil can be preferably used.

The alkylated cyclopentane oil is the lubricating oil having a chemical formula 1 shown below:

[Chemical Formula 1]

where R denotes straight-chain or branched alkyl group, and m denotes integers of 3 to 4.

As examples of the alkylated cyclopentane oil, tri (2-octyldodecyl)cyclopentane (vapor pressure (40° C.): $1.0 \times 10^{-8}$ Pa, NYE SYNTHETIC OIL 2001A produced by NYE LUBRICANTS INC.) is used.

It is possible to use the perfluoropolyether oil of both the straight-chain type and the branched type, provide that they satisfy the above-described vapor pressure condition. As examples of the perfluoropolyether oil, DEMNUM S-200 (vapor pressure (40° C.): $1.0 \times 10^{-6}$ Pa produced by DAIKIN INDUSTRIES, LTD.), Fomblin YHVAC140/13 (vapor pressure (40° C.): $1.0 \times 10^{-8}$ Pa produced by Solvay Solexis Inc.), Fomblin Z25 (vapor pressure (40° C.): $1.0 \times 10^{-8}$ Pa produced by Solvay Solexis Inc.), Fomblin Z60 (vapor pressure (40° C.): $1.0 \times 10^{-11}$ Pa produced by Solvay Solexis Inc.), Krytox 143AC (vapor pressure (40° C.): $1.0 \times 10^{-5}$ Pa produced by Du-Pont Inc.), Krytox 143AD (vapor pressure (40° C.): $8.0 \times 10^{-7}$ Pa produced by Du-Pont Inc.), and Krytox L220 (vapor pressure (40° C.): $6.0 \times 10^{-8}$ Pa produced by Du-Pont Inc.) are listed.

The above-described lubricating oils can be used singly or as mixtures, provided that they satisfy the above-described vapor pressure condition.

Within a range in which the object of the present invention is not interfered, as necessary, it is possible to add extreme-pressure agent, antioxidant, rust preventive agent, pour point depressant, ashless dispersant, detergent-dispersant, surface active agent, anti-wear agent to the lubricating oil. As the antioxidant, phenol-based, amine-based, sulfur-based antioxidants can be used singly or as a mixture.

In the case of the rolling bearing retainer for use in the food machine, the lubricating oil with which the resinous porous article is impregnated includes at least one of liquid paraffin, poly-α-olefin, vegetable oil, animal oil, fluorine oil (PFPE), ester oil, silicone oil, and alkylene glycol oil. These lubricating oils have passed the USDA H-1 standard and the FDA standard as substances unharmful to the human body.

The liquid paraffin is a highly refined hydrocarbon oil which is obtained by cleaning a fraction of a comparatively light lubricating oil with sulfuric acid and is mainly composed of alkyl naphthenes. The liquid paraffin is described in "Official Formulary of Food Additives" or "Japanese Pharmacopoeia" as medical liquid paraffin. The liquid paraffin corresponds to food additive liquid paraffin and pharmacopoeia liquid paraffin in U.S.A., U.K., and Germany.

As described above, the poly-α-olefin oil has been evaluated by the standard of the USDA H-1 that it is unharmful to the human body even though it directly contacts food. The poly-α-olefin oil is a synthetic hydrocarbon oil not containing aromatic hydrocarbon or sulfides.

The vegetable oil is a known natural oil which can be used as food or a food additive. For example, it is possible to use camellia oil, olive oil, peanut oil, castor oil, colza oil, and the like.

The animal oil is a known natural oil which can be used as food or a food additive. For example, it is possible to use chrysalis oil, hoof oil, lard oil; and oil of aquatic animal such as sardine oil, herring oil, and the like can be used.

The fluorine oil has passed the above-described USDA H-1 and is composed of three atoms of carbon, fluorine, and oxygen. The fluorine oil has a molecular structure shown by formulas (1), (2) of a chemical formula 2 shown below.

[Chemical Formula 2]

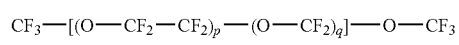
(1)

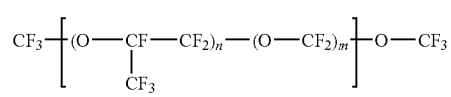
(2)

The ester oil, the silicone oil, and polyalkylene glycol oil have passed the USDA H-1 standard or the FDA standard as substances which are unharmful to the human body, when the concentrations thereof are less than the predetermined concentration.

The ester oil has a —COO— structure contained in dibasic ester oil, polyol ester oil, phosphate ester oil, silicate ester oil, and the like. The ester oil is a synthetic lubricating oil consisting of a compound designated by the FDA standard as an indirect food additive. As examples of the ester oil designated by the FDA standard, monohydrogen phosphate ester oil, dihydrogen phosphate ester oil, and the like are listed.

Of the known silicone oils serving as a polymer-type synthetic lubricating oil, the silicone oil has been designated by the FDA standard. It is possible to adopt the silicone oil (for example, dimethylpolysiloxane oil) shown by the following chemical formula 3.

[Chemical Formula 3]

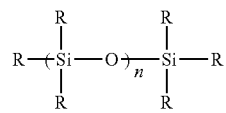

where R denotes methyl group or phenyl group or a group of mixture of methyl group and phenyl group).

As examples of the silicone oil (organopolysiloxane oil), alkyl methyl silicone oil such as dimethyl silicone oil; and phenyl methyl silicone oil are listed.

The polyalkylene glycol oil includes polyethylene glycol oil and polypropylene glycol oil known as synthetic lubricating oil. These oils are the synthetic lubricating oils provided in the above-described FDA.

A lubricating oil containing at least one kind of the above-described lubricating oils can be used for the retainer of the rolling bearing for use in the food machine.

Within the range in which the object of the present invention is not interfered, as necessary, it is possible to add the extreme-pressure agent, the antioxidant, the rust preventive agent, the pour point dropping agent, the ash-free dispersing agent, the metal purifying agent, the surface active agent, the wear-adjusting agent to the lubricating oil. As the antioxidant, phenol-based, amine-based, sulfur-based antioxidants can be used singly or as a mixture.

The retainer of the present invention can be used for a rolling bearing including an inner ring having a rolling surface on its peripheral surface; an outer ring, having a rolling surface on its inner peripheral surface, which is disposed concentrically with the inner ring; a plurality of rolling elements disposed between both ring rolling surfaces; and a retainer holding a plurality of the rolling elements. In this case, because the lubricating oil is supplied to the rolling bearing from the retainer for a long time, the rolling bearing displays a superior durability even though the lubricating grease is not enclosed therein. In the case where the lubricating grease is enclosed in the retainer, it is possible to arbitrarily choose the combination of the lubricating oil impregnating the resinous porous article and the base oil of the lubricating grease. Therefore it is possible to select the mutually soluble base oil in a condition of environment where the rolling bearing operates and further set a grease-enclosing amount to 5 to 20% of the volume of the entire space of the bearing. Consequently it is possible to obtain the rolling bearing from which grease leaks in a small amount.

Rolling bearings to which the retainer of the present invention is applicable are a cylindrical roller bearing and a tapered roller bearing as well as a ball bearing.

An example of the rolling bearing in which the retainer of the present invention is used is shown in FIG. 2. FIG. 2 is a sectional view of a grease-enclosed deep groove ball bearing.

In a grease-enclosed deep groove bearing 6, an inner ring 7 having a rolling surface 7a on its peripheral surface and an outer ring 8 having a rolling surface 8a on its inner peripheral surface are concentrically disposed; and a plurality of rolling elements 9 is disposed between the inner ring rolling surface 7a and the outer ring rolling surface 8a. The grease-enclosed bearing 1 further includes a retainer 1 holding a plurality of the rolling elements 9 and a sealing member 10 fixed to the outer ring 8. A lubricating grease 11 is applied to the peripheries of the rolling elements 9.

As base oil composing the lubricating grease, those listed as the lubricating oils can be used.

As the thickener composing the lubricating grease, metal soap thickeners such as aluminum soap, lithium soap, sodium soap, composite lithium soap, composite calcium soap, composite aluminum soap; urea compounds such as diurea compounds, polyurea compounds; and powder of fluororesin such as PTFE are listed. These thickeners are used singly or in combination of two kinds or more thereof.

The following known additives to be added to the lubricating grease can be used: an antioxidant such as an extreme-pressure agent, an amine antioxidant, a phenol antioxidant, and the like; a metal inert agent such as benzotriazole, sodium nitrite, and the like; a viscosity index improver such as polymethacrylate, polystyrene, and the like; and a solid lubricant such as molybdenum disulfide, graphite, and the like. These additives can be added to the lubricating grease singly or by combining two or more kinds thereof.

As the base oil of the lubricating grease, it is preferable to use oil which dissolves mutually with the lubricating oil which has impregnated the resinous porous article of the retainer in a condition of environment where the rolling bearing operates. As oils which mutually dissolve, it is favorable that the oils have a similar chemical structure. It is more favorable that the lubricating oil and the base oil are of the same kind of oil and that they have an equal viscosity. By using the above-described lubricating grease and the lubricating oil in combination, the base oil consumed in the lubricating grease is supplied from the lubricating oil which has impregnated the retainer. Thus the amount of the lubricating grease to be enclosed can be decreased. The amount of the lubricating grease to be enclosed is not more than 20% and preferably 5 to 20% of the volume of the entire space of the bearing. When the enclosed amount of the lubricating grease is more than 20%, the grease is liable to leak and a torque is liable to fluctuate.

Because by using the rolling bearing retainer of the present invention as the retainer 1, the lubricating oil is supplied from the retainer to the bearing 6, the bearing 6 can be operated even though lubricating grease 11 is not enclosed therein. In a use in which a low torque and a stable torque have priority, the bearing 6 can be operated with only the lubricating oil contained in the retainer without enclosing the lubricating grease in the bearing.

The rolling bearing, having the above-described construction, in which the retainer of the present invention is incorporated, has a small torque required for rotation and a small torque fluctuation. Thus the rolling bearing is preferably lubricated for a long period of time and displays a superior durability. Even when the lubricating grease is enclosed in the rolling bearing, it is possible to decrease the amount of the lubricating grease to be enclosed therein. Therefore it is possible to obtain the rolling bearing from which a small amount the lubricating grease leaks.

In the case of the rolling bearing for use in the food machine, as the lubricating grease impregnating the retainer and the base oil of the lubricating oil, the above-described lubricating oil having a vapor pressure not more than $1.0 \times 10^{-5}$ Pa at 40° C. is preferable. As the thickener, the metal soap thickener such as the aluminum soap, the lithium soap, the sodium soap, the composite lithium soap, the composite calcium soap, the composite aluminum soap; the urea compounds such as the diurea compounds, the polyurea compounds; and the powder of the fluororesin such as the PTFE are listed.

In the case of the rolling bearing for use in the food machine, a lubricating oil with which the retainer of the rolling bearing for the food machine can be impregnated is used as the base oil of the grease. The base oil is at least one kind of oil selected from among liquid paraffin, poly-α-olefin, vegetable oil, animal oil, fluorine oil (PFPE), ester oil, silicone oil, and alkylene glycol oil.

As compounds which are added to the base oil as the thickener, at least one compound is selected from among the composite aluminum soap, calcium hydrostearate, polyurea, clay, and the powder of the fluororesin such as the PTFE.

Of grease commercially available, it is possible to adopt grease which has passed the FDA standard and the USDA standard.

The rolling bearing for the food machine can be used without applying the lubricating grease to the periphery of the rolling element. Because the retainer consisting of the resinous porous article impregnated with the above-described lubricating oil is used at a sliding portion, the lubricating oil bleeds out to the rolling surface as the bearing rotates.

To keep supplying the lubricating oil to the rolling surface of the bearing and prolong the life of the bearing, it is preferable to apply the lubricating grease to the periphery of the rolling element of the bearing.

The lubricating grease applied to the periphery of the rolling element contains the base oil consisting of the lubricating oil which has impregnated the above-described retainer. Thus the lubricating oil is supplied to the rolling surface of the bearing from both the lubricating grease and the retainer. Thereby it is possible to prolong the life of the bearing.

The amount of the lubricating grease to be enclosed in this case is preferably smaller than the case where the lubricant consists of the lubricating grease, and thus should be 5 to 20 vol % of the volume of the entire space of the bearing.

Considering that the rolling bearing for use in the food machine contacts food materials and products (or semi-product) directly or indirectly and that the rolling bearing is used in a severe use condition in which a solution of salt penetrates thereinto, it is preferable that in view of sanitation and rust prevention, of constituent members of the bearing, the inner ring, the outer ring, and the rolling element to be made of a metal material are made of stainless steel. As the stainless steel, martensitic stainless steels SUS440C can be preferably used.

To improve various mechanical properties of the rolling bearing for use in the food machine by improving the friction and wear characteristics thereof, as a reinforcing material for a sliding material of the rolling bearing to be used to process food, it is possible to add mica, talc, and calcium carbonate thereto. The mica, talc, and calcium carbonate are substances admitted by the FDA specification as being safe even when they contact food and penetrate thereinto.

EXAMPLES

Example 1

Powder of the ultra-high-molecular-weight polyethylene (MIPELON XM220 produced by Mitsui Chemicals Inc.) and powder of sodium benzoate (reagent produced by Wako Pure Chemical Industries, Ltd.) were mixed with each other at a volume ratio of 50:50 for five minutes by using a mixer to obtain mixed powder. The obtained mixed powder was molded into a disk having a diameter of φ30 mm×thickness t 5 mm by a heating compression molding method (200° C.×30 minutes). The molding was cleaned with hot water having a temperature of 80° C. by using the ultrasonic cleaner for 10 hours to elute the sodium benzoate. Thereafter the molding was dried at 100° C. for eight hours to obtain a porous article having an interconnected hole porosity of 48%. The porous article was impregnated with poly-α-olefin oil (PAO) (SYNFLUID 801 (viscosity: 46 $mm^2$/s (40° C.) produced by Nippon Steel Chemical Co., Ltd.) at 60° C. under vacuum. The oil impregnation percentage was 45% with respect to the entire volume. By using this specimen, a bleeding test of the impregnating oil which displays an important characteristic of the retainer was conducted.

Example 2

Powder of ethylene tetrafluoride resin (M15 produced by DAIKIN INDUSTRIES, LTD.) and the powder of the sodium benzoate (reagent produced by Wako Pure Chemical Industries, Ltd.) were mixed with each other at a volume ratio of 50:50 for five minutes by using a mixer to obtain mixed powder. The obtained mixed powder was molded into a disk having a diameter of φ30 mm×thickness t 5 mm by the heating compression molding method (350° C.×30 minutes). The molding was cleaned with hot water having a temperature of 80° C. by using the ultrasonic cleaner for 10 hours to elute the sodium benzoate. Thereafter the molding was dried at 100° C. for eight hours to obtain a porous article having an interconnected hole porosity of 48%. The porous article was impregnated with synthetic hydrocarbon oil (LUCANT HC-20 produced by Mitsui Chemicals Inc. (viscosity: 155 $mm^2$/s (40° C.)) at 100° C. under vacuum. The oil impregnation percentage was 44% with respect to the entire volume. By using this specimen, a bleeding test of the impregnating oil was conducted.

Example 3

Powder of polyether ether ketone (PEEK) resin (150 PF produced by Victrex Inc.), carbon fiber, and the powder of the sodium benzoate (produced by Wako Pure Chemical Industries, Ltd.) were melted and kneaded at a volume ratio of 50:10:40 by using a Brabender to obtain mixed powder. The obtained mixed powder was molded into a disk having a diameter of φ30 mm×thickness t 5 mm by the heating compression molding method (350° C.×30 minutes). The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 39%. The porous article was impregnated with the poly-α-olefin oil (PAO) (SYNFLUID 801 (viscosity: 46 $mm^2$/s (40° C.) produced by Nippon Steel Chemical Co., Ltd.) at 60° C. under vacuum. The oil impregnation percentage was 38% with respect to the entire volume. By using this specimen, a bleeding test of the impregnating oil was conducted.

Comparison Example 1

The powder of the ultra-high-molecular-weight polyethylene (MIPELON XM220 produced by Mitsui Chemicals Inc.), polyethylene wax (SUNTIGHT S produced by Seiko Chemical Co., Ltd.), and poly-α-olefin oil (SYNFLUID 801 produced by Nippon Steel Chemical Co., Ltd., (viscosity: 46 $mm^2$/s (40° C.))) were mixed with each other at a volume ratio of 20:15:65 and put in a die. The mixture was molded into a disk having φ30 mm×thickness t 5 mm by a free sinter method (160° C.×30 minutes). The oil impregnation percentage of the disk after a molding operation finishes was 60% per the entire volume thereof. By using this specimen, a bleeding test of the impregnating oil was conducted.

Bleeding Test of Impregnating Oil

The disk prepared in each of the examples 1, 2, and 3, and the comparison example 1 was sandwiched between two sheets of quantitative filter paper No. 5C (φ100 mm) to examine the migration characteristic of the impregnating oil to the quantitative filter paper as the decrease amount of the impregnating oil of the disk. FIG. 3 shows the results.

As shown in FIG. 3, in each example, bleeding was possible at about 75% of an initial oil impregnation amount. Although the initial oil impregnation amount of the disk of the comparison example 1 was about twice larger than that of the disk of the example 2, the bleeding amount of the impregnating oil of the disk of the comparison example 1 was about 20% of that of the disk of the example 2. It can be understood that the oil-containing porous article of each example had the interconnected hole and is capable of effectively utilizing the impregnating oil.

Example 4

Powder of polyether ether ketone (PEEK) resin (150 PF produced by Victrex Inc.), carbon fiber, and the powder of the sodium benzoate (produced by Wako Pure Chemical Industries, Ltd.) were melted and kneaded at a volume ratio of 50:10:40 by using a Brabender to obtain mixed powder. The obtained mixed powder was molded into a crown-shaped retainer for use in a ball bearing #608 by injection molding. The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 39%. The porous article was impregnated with synthetic hydrocarbon oil (LUCANT HC-20 (viscosity: 155 $mm^2$/s (40° C.) produced by Mitsui Chemicals Inc.) at 100° C. under vacuum. The oil impregnation percentage was 39% with respect to the entire volume. The retainer was incorporated in the bearing #608. By using this rolling bearing, a torque fluctuation test (1) was conducted.

Comparison Example 2

Polyamide 66 resin reinforced with 25 wt % of glass fibers was molded into the crown-shaped retainer for use in the ball bearing #608 by injection molding. The retainer was incorporated in the bearing #608. 0.12 g (30% of entire space volume of bearing) of a lubricating grease containing the synthetic hydrocarbon oil (LUCANT HC-20 (viscosity: 155 mm²/s (40° C.) produced by Mitsui Chemicals Inc.) as its base oil and lithium soap as its thickener was enclosed in the bearing #608. By using this rolling bearing, the torque fluctuation test (1) was conducted.

Torque Fluctuation Test (1)

Each of the bearings #608 obtained in the example 4 and the comparison example 2 was set on a durability test apparatus. The durability test apparatus was operated at an axial load of 979 N and a rotational speed of 500 rpm to measure the torque fluctuation of a rotational shaft. FIG. 4 shows the result.

As shown in FIG. 4, the bearing #608 of the example 4 had a low torque during 800 hours and a small torque fluctuation. The torque of the bearing #608 of the comparison example 2 increased with the passage of time and had a large fluctuation.

The bearing of the example 4 could be operated stably and operated for a long period of time by using the lubricating oil which impregnated the retainer.

Example 5

0.04 g (10% of the volume of the entire space of the bearing) of the lubricating grease used in the comparison example 2 was enclosed in the bearing #608 obtained in the example 4. By using the rolling bearing, a torque fluctuation test was conducted. As a result, similarly to the example, 4, the bearing had a low torque during 800 hours and a small torque fluctuation.

Example 6

Powder of polyether ether ketone resin (150 PF produced by Victrex Inc.), carbon fiber, and the powder of the sodium benzoate (produced by Wako Pure Chemical Industries, Ltd.) were melted and kneaded at a volume ratio of 50:10:40 by using a Brabender to obtain mixed powder. The obtained mixed powder was molded into a crown-shaped retainer for use in a ball bearing #608 by injection molding. The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 400. The porous article was impregnated with alkylated cyclopentane oil (NYE SYNTHETIC OIL 2001A produced by NYE LUBRICANTS INC.) at 100° C. under vacuum. The oil impregnation percentage was 39% per entire volume. The oil impregnation amount was 0.1 g. The retainer was incorporated in the bearing #608 (type 608, outer diameter: 22 mm, inner diameter: 8 mm, and width: 7 mm) made of SUS440.

Example 7

Powder of polyether ether ketone resin (150 PF produced by Victrex Inc.), carbon fiber, and the powder of the sodium benzoate (produced by Wako Pure Chemical Industries, Ltd.) were melted and kneaded at a volume ratio of 50:10:40 by using a Brabender to obtain mixed powder. The obtained mixed powder was molded into a crown-shaped retainer for use in a ball bearing #608 by injection molding. The molding was cleaned with hot water having a temperature of 80° C. for 10 hours by using the ultrasonic cleaner to elute the sodium benzoate. Thereafter the molding was dried at 100° C. for eight hours to obtain a porous article having an interconnected hole porosity of 40%. The porous article was impregnated with perfluoropolyether oil (DEMNUM s-200 produced by DAIKIN INDUSTRIES, LTD.) at 100° C. under vacuum. The oil impregnation percentage was 39% per entire volume. The oil impregnation amount was 0.18 g. The retainer was incorporated in the bearing #608 made of SUS440.

Comparison Example 3

Powder of polyimide resin (UIP-R produced by UBE INDUSTRIES, LTD., average particle diameter: 9 μm) having a repeating unit structure shown by the following chemical formula 4 was molded at a molding pressure of 9000 kgf/cm² and sintered in a nitrogen atmosphere at 400° C. for two hours. The obtained sintered resin was machined to obtain the crown-shaped retainer, for use in the ball bearing #608, which consisted of a porous article having an interconnected hole porosity of 15%. The retainer was impregnated with the alkylated cyclopentane oil (NYESYNTHETIC OIL 2001A produced by NYE LUBRICANTS INC.) at 100° C. under vacuum. The oil impregnation amount was 0.035 g. The case was incorporated in the bearing #608.

[Chemical formula 4]

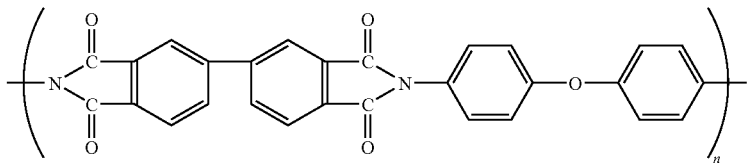

Comparison Example 4

The powder of the polyimide resin (UIP-R produced by UBE INDUSTRIES, LTD., average particle diameter: 9 μm) having a repeating unit structure shown by the chemical formula 4 was molded at the molding pressure of 4000 kgf/cm² and sintered in a nitrogen atmosphere at 400° C. for two hours. The obtained sintered resin was machined to obtain the crown-shaped retainer, for use in the ball bearing #608, which consisted of a porous article having the interconnected hole porosity of 15%. The retainer was impregnated with the perfluoropolyether oil (DEMNUM s-200 produced by DAIKIN INDUSTRIES, LTD.) at 100° C. under vacuum. The oil impregnation amount was 0.065 g. The retainer was incorporated in the bearing #608 made of SUS440;

Tests described below were conducted on the obtained bearings of the examples and the comparison examples. Table 1 shows the results.

Test of Dust-Raised Amount

The bearings were rotated under conditions of a room temperature, a degree of vacuum of $(1$ to $10) \times 10^{-5}$ Pa, a thrust load of 9.8 N (face pressure: 0.7 GPa) or 980 N (face pressure:

2.7 GPa), and a number of rotations of 50 rpm. Dusts whose sizes not less than 0.3 μm were detected for 150 hours by a raised-dust detector (detector of a type of measuring the number of dusts by a sensor using laser beams) disposed directly below the bearings to examine the sum of the number of dusts.

Torque Fluctuation Test (2)

A torque fluctuation degree of each bearing was measured under conditions of the room temperature, a degree of vacuum of $(1 \text{ to } 10) \times 10^{-5}$ Pa, a number of rotations of 200 rpm, a thrust load of 9.8 N (face pressure: 0.7 GPa) or 980 N (face pressure: 2.7 GPa). The torque fluctuation degree of each bearing was evaluated in two stages: Bearings which exceeded $2 \times 10^{-3}$ N·m in the torque fluctuation degree thereof were evaluated as "large" in the torque fluctuations thereof, whereas the bearings which were not more than $1 \times 10^{-3}$ N·m in the torque fluctuation degree thereof were evaluated as "small" in the torque fluctuation thereof.

Durability Test

Under conditions of the room temperature, a degree of vacuum of $(1 \text{ to } 10) \times 10^{-5}$ Pa, a number of rotations of 2500 rpm, a thrust load of 9.8 N (face pressure: 0.7 GPa) or 980N (face pressure: 2.7 GPa), the period of time (hour) until the vibration degree of the obtained bearing became three times as large as that at a time when the test started.

TABLE 1

| | Load (N) | Dust-raised amount (number) | Torque fluctuation | Durability (hour) |
|---|---|---|---|---|
| Example | | | | |
| 6 | 9.8 | 7 | small | Not less than 2000 |
| | 980 | 14 | small | Not leas than 2000 |
| 7 | 9.8 | 10 | small | 1500 |
| Comparison Example | | | | |
| 3 | 9.8 | 5 | small | 1500 |
| | 980 | 15 | small | 1000 |
| 4 | 9.8 | 11 | small | 800 |

The retainer of the example 6 and that of the comparison example 3 had the same degree in the dust-raised amount and the torque fluctuation degree, but the retainer of the former was superior to that of the latter in durability. This is because the retainer of the former contained more oil than the retainer of the latter. The retainer of the example 7 was superior in its durability in the retainers to which a low surface pressure is applied.

Examples of the rolling bearings for the food machine are described below.

Example 8

As resins forming resinous porous articles, three kinds of resins, namely, the PEEK resin powder (150P produced by Victrex Inc.), the powder of the ultra-high-molecular-weight polyethylene (MIPELON XM220 produced by Mitsui Chemicals Inc.), and the powder of polyacetal resin (POM) (M140-49 produced by Polyplastics Co., Ltd.) were prepared. As pore-forming substances, two kinds of powders of sodium salts, namely, the powder of the sodium benzoate (reagent produced by Wako Pure Chemical Industries, Ltd.) and powder of sodium chloride (reagent produced by Wako Pure Chemical Industries, Ltd.) were prepared.

One kind of the above-described resins and one kind of the above-described pore-forming substances were mixed with each other at a volume ratio of 50:50 by using a mixer for five minutes. The obtained mixed powder was molded into a disk having a diameter of ϕ30 mm×thickness t 5 mm by the heating compression molding method (at recommended molding temperature of each resin for 30 minutes). The molding was cleaned with hot water having a temperature of 80° C. by using the ultrasonic cleaner to elute the pore-forming substance. Thereafter the pore-forming substance was dried to obtain a porous article having an interconnected hole porosity of 45 to 48%. This operation was performed for all the prepared resins and the pore-forming substances to obtain six kinds of resinous porous articles.

The six kinds of the resinous porous article were impregnated with the SYNFLUID 801 (viscosity: 46 mm²/s at 40° C.) produced by Nippon Steel Chemical Co., Ltd. or liquid paraffin P260 (viscosity: 50 mm²/s at 40° C.) produced by Matsumura Oil Research Corp. under vacuum. As a result, 12 kinds of oil-containing resinous porous articles were obtained.

The obtained 12 kinds of the oil-containing resinous porous articles could contain 42 to 45% of oil for the entire volume of the porous article. More specifically, degrees of freedom of the combinations of the materials that the oil-containing resinous porous article can be formed by arbitrarily combining any of the prepared three kinds of the resins, two kinds of the pore-forming substances, and two kinds of the lubricating oils with each other could be confirmed. Therefore according to a use of a food-processing machine, it is possible to choose combinations of the resins, the pore-forming substances, and the lubricating oils and form an optimum oil-containing resinous porous article.

Example 9

The PEEK resin powder (150P produced by Victrex Inc.) and the powder of the sodium chloride (reagent produced by Wako Pure Chemical Industries, Ltd.) serving as the pore-forming substance were mixed with each other at a volume ratio of 50:50 by using the mixer for five minutes to mold the mixer to obtain a retainer for the bearing (6204) by using the heating compression molding method (370° C.×30 minutes). The obtained molding was cleaned with hot water having a temperature of 80° C. by using the ultrasonic cleaner to elute the pore-forming substance. The pore-forming substance was dried to obtain a porous article having an interconnected hole porosity of 48%. The porous article was impregnated with the SYNFLUID 801 (viscosity: 46 mm²/s at 40° C.) produced by Nippon Steel Chemical Co., Ltd. under vacuum to obtain the retainer. The oil impregnation percentage was 45% of the entire volume of the retainer. The retainer was incorporated in a rolling bearing 6204ZZ (produced by NTN).

Comparison Example 5

Powder of Nylon-12 (Diamide fine particle powder L1640P produced by Daicel-Huls Co., Ltd.) and grease (grease thickened with polyurea by using poly-α-olefin oil (LUCANT HC-600 (viscosity: 9850 mm²/s, 40° C.) produced by Mitsui Chemicals Inc. as base oil) for a food machine was mixed with each other by the mixer for five minutes. Thereafter the mixture was enclosed in the rolling bearing 6204ZZ (produced by NTN) (retainer made of iron) at 100 vol % of the entire space volume thereof. The mixture was calcined at 190° C. for 30 minutes.

Durability Test

To evaluate the durability and torque of the obtained rolling bearings of the example 9 and the comparison example 5, a durability test and a torque test were conducted under the following conditions. Table 2 shows evaluated results.

With a radial load of 6.8 Kgf and an axial load of 6.8 Kgf kept applied to the test bearing 6204ZZ (produced by NTN), an inner ring thereof was operated at a speed of 3000 rpm at 120° C. to examine an endurance period of time.

The endurance limit of the bearing was evaluated when input electric current of a motor for driving the inner ring of the bearing exceeded a limit electric current (twice larger than normal value).

Torque Test

With a radial load of 39 N kept applied to the test bearing 6204ZZ (produced by NTN), the inner ring was operated at 1800 rpm to examine the torque thereof.

TABLE 2

|  | Example 9 | Comparison Example 5 |
|---|---|---|
| Endurance period of time (hour) | Not less than 2000 | 1000 |
| Torque, ×10$^{-4}$ Nm | 70 | 340 |

In the rolling bearing of the example 9, after elapse of 2000 hours which is six times larger than the endurance period of time of the bearing of the comparison example 5, the input electric current of the motor for driving the inner ring of the bearing did not exceed the limit electric current (twice larger than normal value).

The rolling bearing of the example 9 showed a torque as low as about ⅕ of the torque of the bearing of the comparison example 5. That is, because the retainer consisting of the resinous porous article of the PEEK resin impregnated with the lubricating oil at a high content of 45 vol % is used at the sliding portion, the lubricating oil bleeds out to the rolling surface as the bearing rotates. Thus the bearing of the example 9 displays frictional and wear properties superior to those of a molding of the comparison example 5 consisting of nylon 12 containing 60 wt % of grease.

INDUSTRIAL APPLICABILITY

The rolling bearing retainer of the present invention is capable of supplying the lubricating oil to the bearing for a long time. Thereby the rolling bearing in which this retainer is used has a small torque and a small torque fluctuation, displays an excellent durability, andhas a small amount of leak in the lubricating grease. Therefore the rolling bearing retainer can be used as a main part in a lot of uses.

Under a vacuum condition, a gas is not generated from the lubricating oil, dust is raised to a low extent, and the rolling bearing retainer can be used for a long time. Therefore the rolling bearing retainer can be preferably used as a main part of an apparatus which is used under the vacuum condition and of an apparatus which is used in a clean room.

Because the rolling bearing of the present invention for use in the food machine has the interconnected hole porosity not less than 30%, the lubricating oil is reliably supplied to the rolling surface of the bearing from the bearing retainer for a long time. Thus rolling bearing displays an excellent durability. Because it is possible to decrease the torque required to rotate the bearing, the rolling bearing of the present invention for use in the food machine can be used as a rotary bearing apparatus of a miniaturized food machine.

EXPLANATION OF REFERENCE NUMERALS AND SYMBOLS

Figure 1:
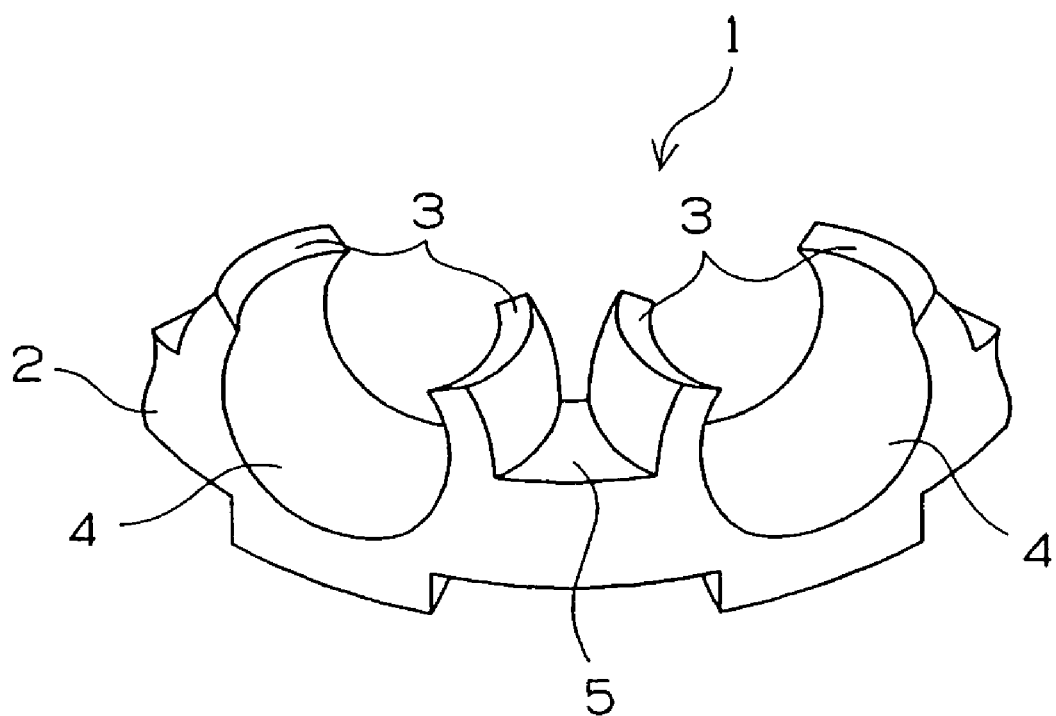
FIG. 1 is a partly enlarged perspective view of a crown-shaped retainer composed of an integrally molded resin composition.
Figure 2:
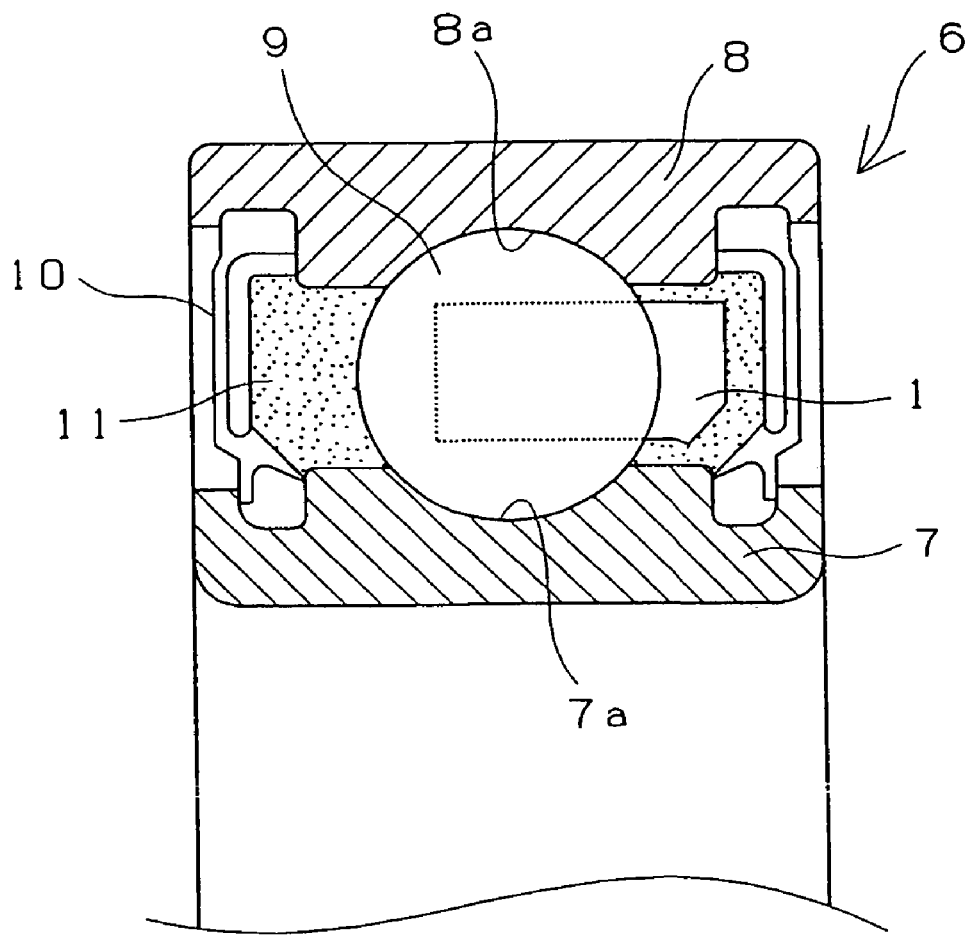
FIG. 2 is a sectional view of a grease-enclosed deep groove ball bearing.
Figure 3:
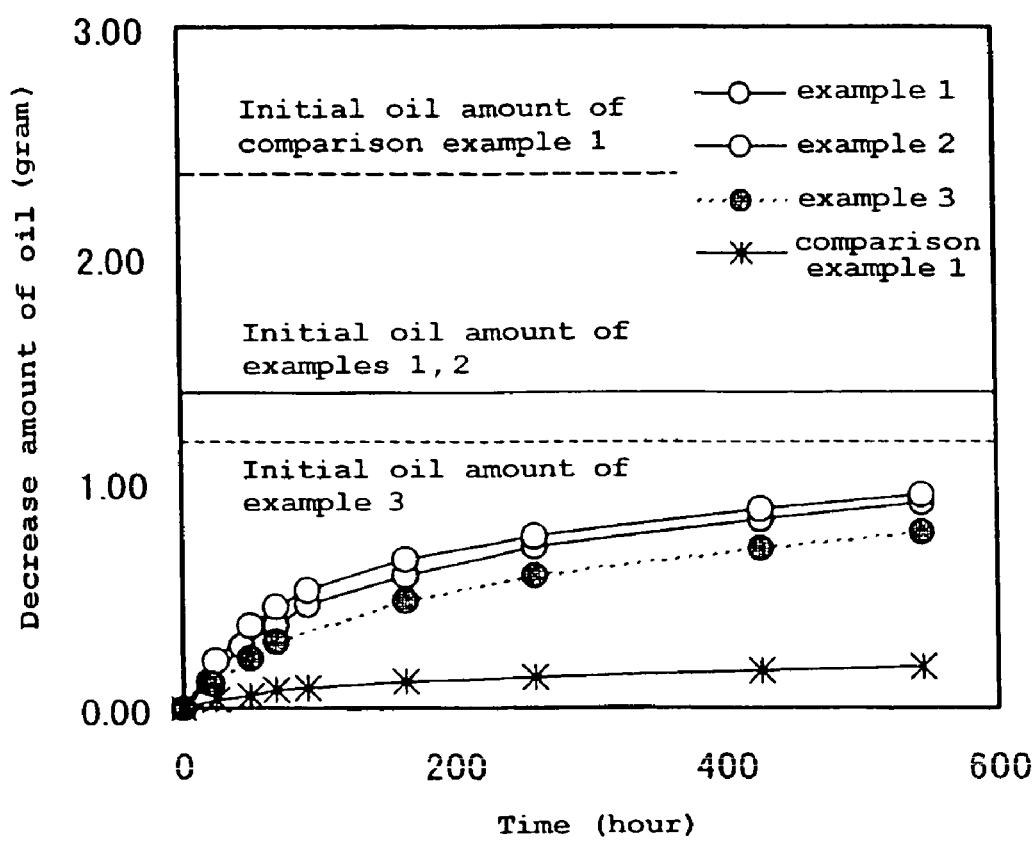
FIG. 3 shows a bleeding test of impregnating oil.
Figure 4:
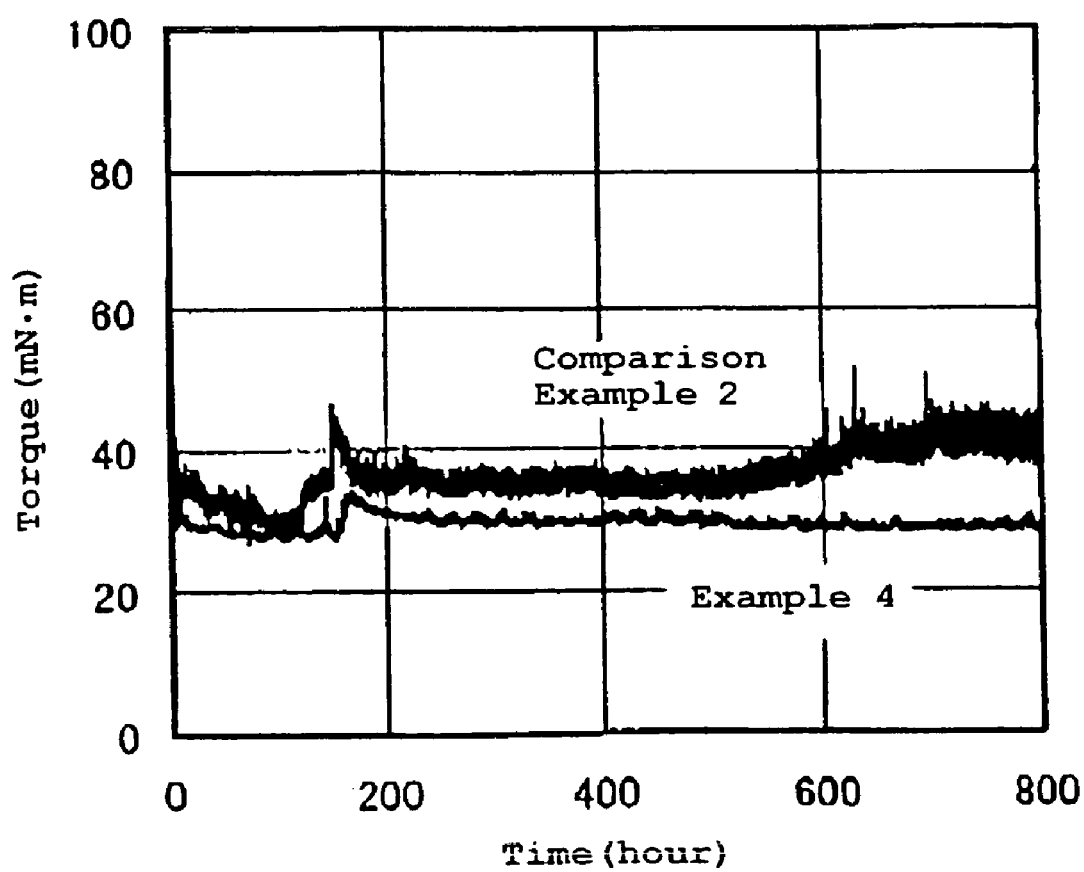
FIG. 4 shows results of a torque fluctuation test (1).

1: rolling bearing retainer
2: retainer body
3: retainer claw
4: pocket for holding rolling element
5: flat portion
6: grease-enclosed deep groove ball bearing
7: inner ring
8: outer ring
9: rolling element
10: sealing member
11: lubricating grease

The invention claimed is:

1. A rolling bearing, comprising an inner ring having a rolling surface on a peripheral surface thereof; an outer ring, having a rolling surface on an inner peripheral surface thereof, which is disposed concentrically with said inner ring; a plurality of rolling elements disposed between said both rolling surfaces; and a retainer holding a plurality of said rolling elements, wherein said retainer comprises a molding, of a synthetic resin composition, which holds a rolling element of a rolling bearing, wherein said molding comprises a resinous porous article having an interconnected hole porosity not less than 30% and a lubricating oil which impregnates said resinous porous article, wherein said resinous porous article is formed by molding a resin containing a pore-forming substance incorporated therein, and by extracting said pore-forming substance from said molding with a solvent which dissolves said pore-forming substance and does not dissolve said resin which is used for a vacuum apparatus used in an atmosphere having a pressure not more than $1.0 \times 10^{-4}$ Pa.

2. The rolling bearing according to claim 1, wherein said lubricating oil has a vapor pressure not more than $1.0 \times 10^{-5}$ Pa at 40° C.

3. The rolling bearing according to claim 2, wherein said lubricating oil consists of alkylated cyclopentane oil.

4. The rolling bearing according to claim 2, wherein said lubricating oil consists of a perfluoropolyether oil.

5. The rolling bearing according to claim 1, wherein lubricating grease is applied to a periphery of a plurality of said rolling elements; a vapor pressure of a base oil of said lubricating grease at 40° C. is not more than $1.0 \times 10^{-5}$ Pa.

6. The rolling bearing according to claim 1, which is used for a food machine, wherein said said pore-forming substance has a melting point higher than that of said resin and can be used as a food material, and by extracting said pore-forming substance from said molding with a solvent which dissolves said pore-forming substance and does not dissolve said resin.

7. The rolling bearing according to claim 6, wherein said pore-forming substance is food or a food additive.

8. The rolling bearing according to claim 7, wherein said food additive is at least one alkali metal salt selected from among sodium chloride, sodium carbonate, sodium benzoate, sodium metaphosphate, sodium pyrophosphate, sodium triphosphate, potassium carbonate, and potassium sulfate.

9. The rolling bearing according to claim 6, wherein said resin is at least one resin selected from among polyolefin resin, polyamide resin, polyacetal resin, fluororesin, polyether ether ketone resin, polyethylene terephthalate resin, polybutylene terephthalate resin, and biodegradable resin.

10. The rolling bearing according to claim 6, wherein said lubricating oil is at least one oil selected from among liquid-paraffin oil, poly-α-olefin oil, vegetable oil, animal oil, fluorine oil, ester oil, silicone oil, and alkylene glycol oil.

11. The rolling bearing according to claim 6, wherein an inner ring, an outer ring, and a plurality of rolling elements disposed between said inner ring and said outer ring are made of stainless steel.

12. The rolling bearing according to claim 6, a lubricating grease that can be used for said food machine is applied to peripheries of a plurality of said rolling elements.

13. The rolling bearing according to claim 12, wherein said lubricating oil is used as a base oil of said lubricating grease.

14. The rolling bearing according to claim 12, wherein a thickener of said lubricating grease is at least one compound selected from among composite aluminum soap, calcium hydrostearate, polyurea, clay, and fluororesin.

* * * * *